No. 855,077. PATENTED MAY 28, 1907.
E. L. THOMPSON.
SPRINKLER ALARM DEVICE.
APPLICATION FILED FEB. 6, 1906.
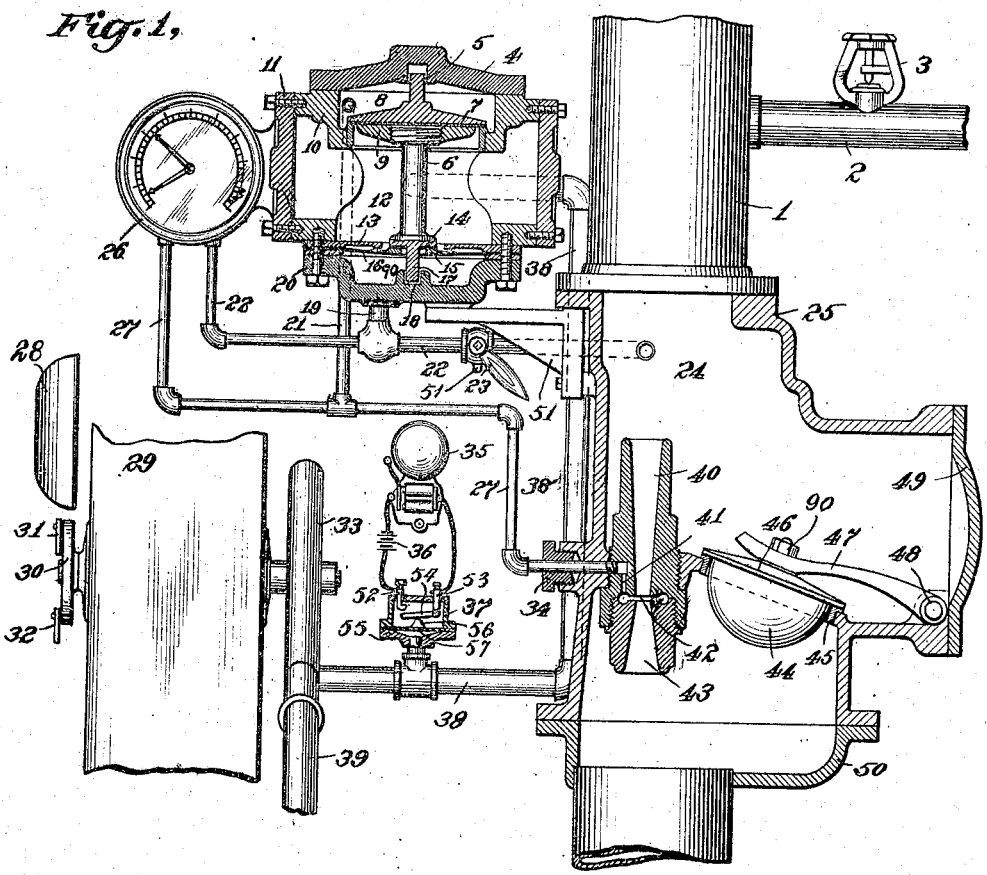
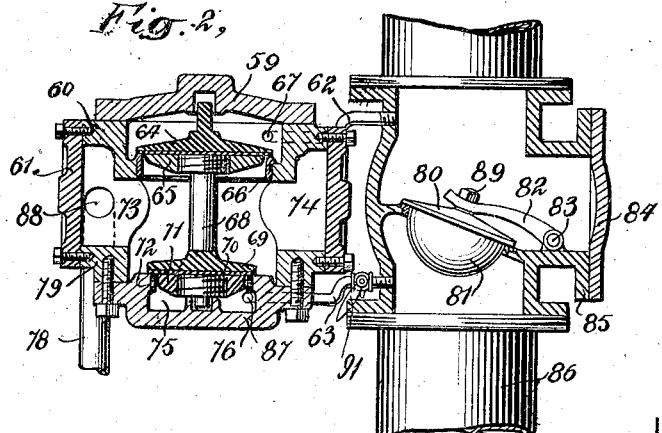
WITNESSES:
INVENTOR
Everett L. Thompson
BY
Duncan & Duncan ATTORNEYS

UNITED STATES PATENT OFFICE.

EVERETT L. THOMPSON, OF NEW YORK, N. Y.

SPRINKLER ALARM DEVICE.

No. 855,077.   Specification of Letters Patent.   Patented May 28, 1907.

Application filed February 6, 1906. Serial No. 299,797.

*To all whom it may concern:*

Be it known that I, EVERETT L. THOMPSON, a citizen of the United States, and a resident of the borough of Brooklyn, county of Kings, city and State of New York, have invented certain new and useful Improvements in Sprinkler Alarm Devices, of which the following is a specification, taken in connection with the accompanying drawings, which form a part of the same.

This invention relates to sprinkler alarm devices and relates especially to devices which are adapted to act in connection with an automatic sprinkler system and to give an alarm when the sprinklers operate.

In the accompanying drawings showing illustrative embodiments of this invention, Figure 1 shows in section an embodiment of this invention, parts being shown diagrammatically and Fig. 2 is a sectional view of another illustrative embodiment.

In the illustrative form of this device shown in Fig. 1 the usual supply pipe 1 is indicated as connected with distributing pipes such as 2, which may be provided with automatic sprinklers 3 of any desired construction. The supply pipe may be provided with an enlarged check valve casing 25, the lower section 50 of which is connected to the lower part of the supply pipe. A suitable check valve may be arranged in any desired position within the casing and the valve 46 may be located in the position indicated, this valve being formed with the substantially hemispherical lower portion 44 and being revolubly mounted by the stud 90 upon the valve lever 47. This lever may be pivotally mounted about the pin 48 in the casing so as to allow the valve to coöperate with the valve seat 45. There is preferably sufficient looseness in the valve connections to allow the accurate engagement of the valve with its seat under all conditions of operation. A removable cover 49 may be provided on the casing to allow of examination of the inner parts. A suitable Venturi tube may, if desired, be mounted within each check valve casing substantially in line with the supply pipe, although this is not necessary in all cases. This venturi tube may be composed of the jet nozzle 40 screwed into the transverse partition across the valve casing below the chamber 24 and the coöperating nozzle section 43 may be screwed into the section 40. In this way the exhaust passage 42 may be conveniently formed so as to provide an annular opening at the constricted throat of the venturi tube. This exhaust passage communicates through the passage 41 with the exhaust pipe 27 which may pass through a suitable stuffing box 34.

A suitable balanced valve is preferably provided in connection with this check valve casing and may be conveniently supported on the bracket 51. The body 11 of this balanced valve casing carries the seat support 10 with which the upper portion of the balanced valve coacts a suitable facing 7 being provided on the valve to coöperate with this seat and this facing being held in position by the heavy washer 9 screwed upon the valve or otherwise secured thereto. A similar facing 14 is provided at the lower end of the balanced valve 6 and may coöperate with the yielding valve seat 15 which as indicated may be mounted on the resilient diaphragm 16 secured to the body of the valve casing and clamped in position by the lower head 20 which may be bolted in place. The upper head 4 may be secured in a similar way so that the exhaust chamber 8 is formed above the valve, the intermediate neutral chamber 12 between the two valve faces and the pressure chamber 90 below the diaphragm which, if desired, may be limited in its upward movement by a suitable stop in the form of the annular plate 13. It is, of course, apparent that this resilient diaphragm on which the lower valve seat is mounted allows the accurate seating of both faces of the valve, the diaphragm yielding sufficiently to secure the tight closure of both openings regardless of slight inaccuracies of adjustment or construction of parts. The size of the upper valve seat and coöperating valve faces are properly proportioned so as to give a tight closure and a definite and reliable operation of the valve under the conditions of service. The balanced valve is loosely guided in its operation by the two pins 5 and 17 which loosely engage suitable apertures in the casing, such as 18. The balanced valve may be operated by connecting the pressure chamber 90 with the check valve chamber 24 by the pressure pipe 22 which is preferably provided with the setting valve 23 by which this connection may be cut off and this valve may also be provided with a drain aperture 51 which allows fluid to escape at this point. The exhaust chamber may be connected with the exhaust passage 42 by means of the exhaust pipe 21 and 27 as indicated, the pipe 27 also connecting with a suitable indicator 26 so as to show the pressure within the exhaust passage and chamber. In a similar manner, this indicator which may be provided with two needles may be connected with the pipe 22 and indicate the pressure in the pressure chamber of the balanced valve. The neutral chamber 12 of this balanced valve is connected with the alarm pipe 38 which preferably has an open connection, allowing this pipe and chamber to drain and which is also connected with suitable alarm mechanism. As indicated this pipe may be connected with and operate a suitable electric alarm 35, the pipe communicating with a diaphragm chamber 55 by which the pressure within the pipe is exerted on the underside of the diaphragm 57 and the movement of this diaphragm operates the stud 56 attached thereto. This raises the pivoted contact lever 54 so as to make electric contact between the two terminals 52 and 53. This closes the electric circuit indicated through the battery 36 and the electric bell 35 so as to operate the latter continuously. A suitable mechanical alarm may also be provided and operated from this pressure pipe and this alarm may be in the form of a water motor 33 mounted on a suitable support such as a wall 29, and provided with the discharge and drain pipe 39. This motor rotates the disk 30 so as to throw the pivoted hammers 31, 32 into contact with the bell 38 which may be located outside of the partition or wall 29, if desired.

The open unrestricted passage through the Venturi tube minimizes the danger of this alarm device being operated by water hammer, since small pulsatory changes in water pressure are relieved by this open passage and since a larger momentary impulse could be relieved by slightly lifting the check valve 46 from its seat. If, however, the sprinklers operate in the distributing system a steady flow occurs through the venturi tube causing a diminution of pressure in the exhaust passage and exhaust pipe. This relieves the pressure to some extent in the exhaust chamber above the balanced valve. The pressure in the pressure chamber 90 exerted upon the diaphragm is thereupon sufficient to raise the valve whereupon water is immediately admitted in large quantities to the neutral chamber 12 and passes through the alarm pipe 38 to operate the alarms as indicated. In resetting the valve a positive operation can be effected by moving the setting valve 23 so as to close the connection between the check valve chamber 24 and the pressure chamber of the balanced valve and at the same time allow the pressure chamber to drain through the opening 51. Under these circumstances the pressure through the pipe 27 acts upon the upper side of the balanced valve and forces it firmly downward against its seat, thus bringing the lower face of this valve into close connection with the movable seat on the diaphragm so that the mechanism is in the position indicated.

Referring to Fig. 2, the supply pipe 86 may be as indicated connected with the check valve casing 85 within which is mounted a suitable check valve 80 having the hemispherical portion 81 and connected with the valve lever 82 by the stud 89 so that the valve may move about the valve pivot 83. These parts, of course, are readily accessible when the cover 84 is removed. The body 61 of the balanced valve casing carries the seat support 60 in which the valve seat 66 is mounted so as to coact with the upper face 64 of the balanced valve 68, a suitable facing being clamped between the part 64 and the washer 65, if desired. The lower face 69 of this valve is indicated as smaller than the upper face, the relative proportion of these parts being adjusted so as to give the desired firmness of seating and sensitiveness of action of the device. The support 76 carries the valve seat 72 and rigidly holds it in proper position and this seat is engaged by a suitable facing 70 clamped in position by a washer 71, if desired.

By this construction the intermediate neutral chamber 74 is formed which is provided with the opening 88 leading to the alarm pipe 38 which may operate suitable alarm mechanism such as described in connection with Fig. 1. The exhaust chamber 73 above the upper face of the balanced valve 68 is provided with the opening 67 connected through the exhaust pipe 62 with the chamber above the check-valve and in a similar way the pressure chamber 75 is provided with the hole 87 communicating with the pressure pipe 63 which is connected with the supply pipe below the check valve and which may be provided with a setting valve 91 to drain this pressure chamber when desired. When the sprinkler heads operate there is momentarily a greater pressure in the supply pipe below the check valve than above it at the instant before the check valve raises. This excess of pressure acts through the pressure pipe and pressure chamber to raise the balanced valve against the reduced pressure then acting in the exhaust chamber 73. Thereupon the neutral chamber 74 fills with water which passes through the alarm pipe 38 and operates the alarm mechanism. The balanced valve can be conveniently reset by operating the setting valve 91 so as to simultaneously drain the pressure chamber 75.

Having thus described this invention in connection with several illustrative embodiments of the same, to the details of which I do not desire to be limited, what is claimed as new and what is desired to secure by Letters Patent is set forth in the appended claims.

1. In sprinkler alarm devices, a check valve casing connected with a supply pipe and distributing system and provided with a check valve and a Venturi tube substantially in line with said supply pipe, a balanced valve casing adjacent said supply pipe and provided with an exhaust chamber having a valve seat, an intermediate neutral chamber and a pressure chamber, a resilient diaphragm provided with a valve seat between said neutral chamber and said pressure chamber and a balanced valve mounted within said casing and coöperating with said seats, alarm mechanism, a pressure pipe provided with a setting valve connecting said pressure chamber and said supply pipe, an exhaust pipe connecting said exhaust chamber and the throat of said Venturi tube and an alarm pipe connected with said neutral chamber and operating said alarm mechanism.

2. In sprinkler alarm devices, a check valve casing, a check valve and Venturi tube within said casing, a balanced valve casing having an exhaust chamber provided with a seat, a neutral chamber and a pressure chamber, a resilient diaphragm provided with a valve seat adjacent said pressure chamber, a connected valve mechanism coöperating with said valve seats, alarm mechanism, a pressure pipe connecting said pressure chamber and said valve casing, an exhaust pipe connecting said exhaust chamber and said Venturi tube and an alarm pipe connecting said neutral chamber and said alarm mechanism.

3. In sprinkler alarm devices, a supply pipe, a Venturi tube communicating with said supply pipe to be operated by a flow through said pipe, a valve casing provided with an exhaust chamber, a neutral chamber and a pressure chamber, valve seats adjacent either side of said pressure chamber, one of said valve seats being yieldably mounted, a balanced valve coöperating with said seats, an exhaust pipe to connect said exhaust chamber with said Venturi tube, a pressure pipe to connect said pressure chamber with said supply pipe and alarm mechanism operated by the pressure in said neutral chamber.

4. In sprinkler alarm devices, a supply pipe, a Venturi tube connected with and operated by flow in said supply pipe, a valve casing provided with an exhaust chamber, a neutral chamber having a drain aperture and a pressure chamber, coöperating valve seats adjacent said neutral chamber, connected valves coöperating with said valve seats, an exhaust pipe connecting said exhaust chamber with said Venturi tube and a pressure pipe provided with a setting valve connecting said pressure chamber with said supply pipe.

5. In sprinkler alarm devices, a supply pipe, means to cause a difference of pressure on the commencement of flow through said supply pipe, a balanced valve casing provided with an exhaust chamber, a neutral chamber and a pressure chamber, valve seats adjacent said neutral chamber, connected valve mechanism coöperating with said seats, alarm mechanism connected with said neutral chamber, an exhaust pipe connecting said exhaust chamber and said supply pipe and a pressure pipe connecting said exhaust chamber and said supply pipe to cause a change in the relative pressure in said pressure and exhaust chambers on the commencement of flow through said supply pipe.

6. In sprinkler alarm devices, a balanced valve casing provided with an exhaust chamber, a neutral chamber and a pressure chamber, valve seats between said chambers, one of said seats being yieldably mounted, coöperating connected valve mechanism coöperating with said seats, a pressure pipe provided with a setting valve having a drain aperture connected with said pressure chamber to connect the same with a supply pipe, an exhaust pipe connected with said exhaust chamber and an indicator connected with said pressure and exhaust chambers.

7. In sprinkler alarm devices a balanced valve casing having an exhaust chamber, a neutral chamber and a pressure chamber, valve seats between said chambers, connected valve mechanism coöperating with said seats, a pressure pipe provided with a setting valve and drain aperture connected with said pressure chamber to connect the same with a supply pipe, means to drain said neutral chamber and a pressure pipe to connect said pressure chamber with a sprinkler system.

8. In sprinkler alarm devices, a balanced valve casing having an exhaust chamber, a neutral chamber and a pressure chamber, a valve seat between said exhaust chamber and said neutral chamber, a diaphragm between said neutral chamber and said pressure chamber, a valve seat mounted on said diaphragm, a stop coöperating with said diaphragm to limit the movement thereof and a balanced valve loosely mounted within said casing and coöperating with said valve seats.

9. In sprinkler alarm devices, a valve casing provided with an exhaust chamber, a pressure chamber and an intermediate neutral chamber, a valve seat on one side of said neutral chamber, a yielding diaphragm on the other side of said neutral chamber, a valve seat on said diaphragm, a stop to limit the movement of said diaphragm and connected valve mechanism coöperating with said valve seats to separate said neutral chamber from said exhaust and pressure chambers.

EVERETT L. THOMPSON.

Witnesses:
HARRY L. DUNCAN,
JESSIE B. KAY.